SELECTIVE MASKING AND EXPOSURE MEANS FOR DUPLICATING MACHINE

Filed Aug. 17, 1964 2 Sheets-Sheet 1

INVENTOR.
Eli A. Port
By Silverman & Cass
ATTORNEYS.

May 2, 1967 E. A. PORT 3,316,826

SELECTIVE MASKING AND EXPOSURE MEANS FOR DUPLICATING MACHINE

Filed Aug. 17, 1964

2 Sheets-Sheet 2

INVENTOR.
Eli A. Port
By Silverman & Cass
ATTORNEYS.

United States Patent Office 3,316,826

Patented May 2, 1967

3,316,826

SELECTIVE MASKING AND EXPOSURE MEANS FOR DUPLICATING MACHINE

Eli A. Port, Chicago, Ill., assignor to Alpha Research & Development, Inc., Blue Island, Ill., a corporation of Illinois Filed Aug. 17, 1964, Ser. No. 389,835
19 Claims. (Cl. 95—77.5)

This invention relates generally to duplicating apparatus and more particularly, to novel selective light masking and exposure means for use in multiple copy producing machines used in photosensitive processes, such as the diazo process.

Although not necessarily limited thereto, the invention will be described in detail with reference to the so-called diazo type process. Previous systems for selectively masking and exposing diazo materials were cumbersome in design, slow in operation and difficult to control for fast and accurate multiple copy work. These disadvantages can be attributed primarily to the mechanical and optical limitations of the previous equipment used. Processing speed is slow because each exposure of the diazo sensitized sheet material to the constant arc lamp used was required to be for a duration of several seconds in order to realize proper exposure. This was deemed necessary by reason of the use of arc lamps such, as the well-known mercury vapor lamp in the exposure of the diazo sensitized sheet. This also resulted in adverse heat accumulations especially when the duplicating equipment was operated substantially continuously over long periods of time, thereby also requiring extensive auxiliary cooling or heat transfer means to be provided in conjunction with such duplicating apparatus.

Previous selective exposure systems also failed to give satisfactory image registration, i.e., location of the masked area would vary between exposures of successive sensitized sheets being fed continuously to the equipment. This registration problem became more critical when a large number of duplicate copies were to be selectively masked and exposed.

Accordingly, it is a principal object of this invention provide novel selective masking and exposure means for use in duplicating apparatus that substantially eliminates the disadvantages hereinabove enumerated as well as others to be noted subsequently herein.

Another object of the invention is to provide selective masking and exposure means of the character described which can successfully mask selective areas of photosensitive materials repeatedly at high speed operation with good economy and very accurate registration heretofore not attainable with conventional machines.

Another object of the invention is to provide selective masking and exposure means of the character described which include a pulsed light source and a timed correlated masking means so as to control exposure of the photosensitized sheet material in sequential continuous operation.

Another object of the invention is to provide apparatus of the character described which will have a materially increased longevity by reason of lower power requirements which can be attributed to a pulsed light source which results in longer quiescent periods than heretofore realized with prior apparatus.

Another object of the invention is to provide a novel method of producing selectively masked duplicate copies in rapid and accurate sequence.

The foregoing and other objects of the invention will become apparent from the ensuing disclosure in which a preferred embodiment has been described in detail in the specification in conjunction with the accompanying drawing. It is contemplated that minor variations may occur to the skilled artisan without departing from the scope or sacrificing any of the advantages of the invention.

Figures 1, 2:
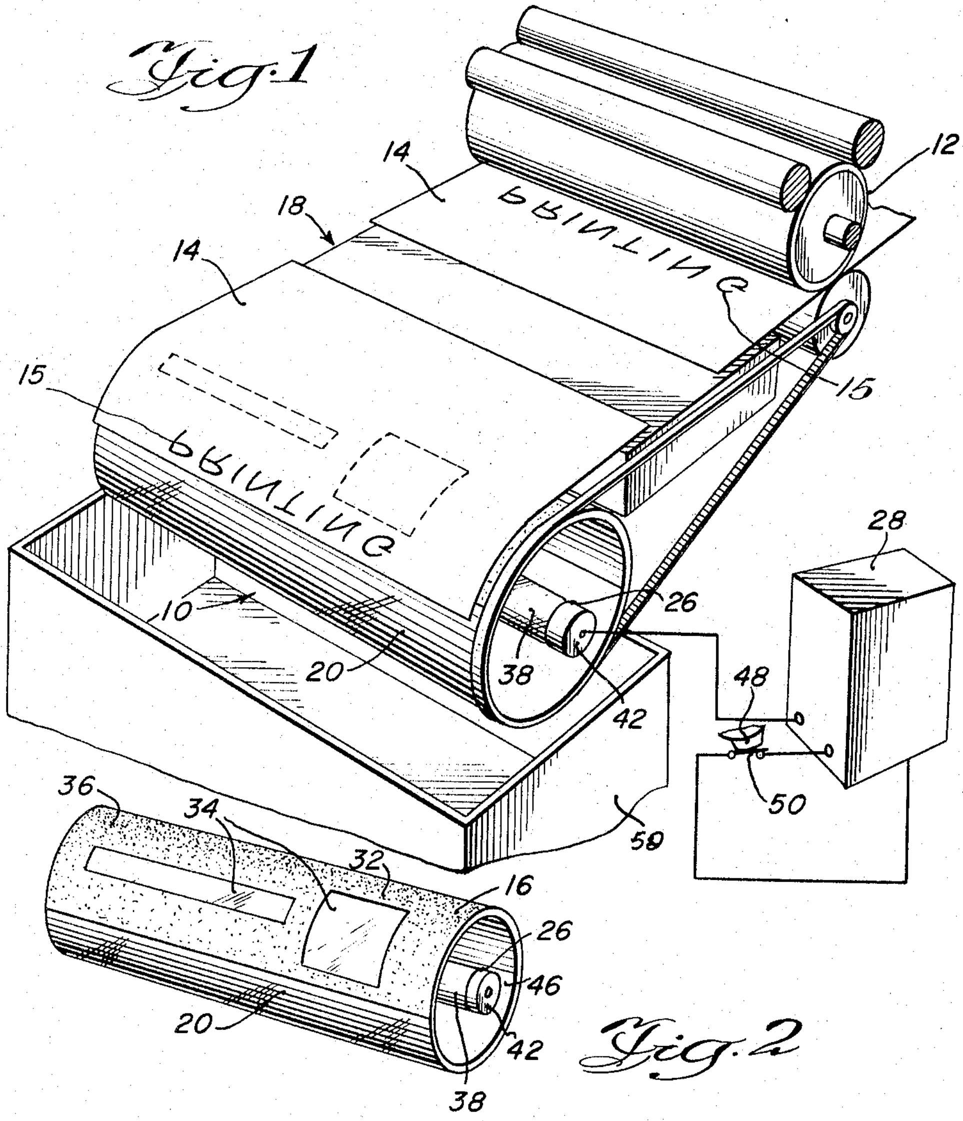
FIG. 1 is a diagrammatic view of a representative duplicating system employing the novel selective masking and exposure apparatus embodying the invention.
FIG. 2 is an enlarged fragmentary perspective view of the masking and exposing apparatus embodying the invention showing greater detail.
Figure 3:
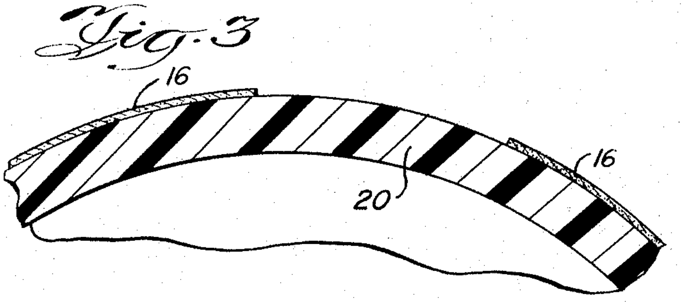
FIG. 3 is a partial detail view of the cylinder.

Referring now to the drawing, in FIG. 1, the apparatus embodying the invention is designated generally by the reference character 10. The apparatus 10 is shown in conjunction with printing apparatus designated generally 12, it being contemplated that the apparatus 10 can be operably associated with the printing apparatus 12 for timed sequential operation therewith.

The photosensitive sheet material 14 which is to be exposed subsequently, first may be imprinted by the representative press 12, such as an offset press, with any identifying heading 15 that may be desired. After printing, the photosensitive sheet 14 is fed to the apparatus 10 by any suitable sheet feed mechanism which is represented generally by reference character 18. This mechanism can be a gravity chute or other conventional sheet feed device, the construction of which has no bearing on the invention and hence has been illustrated diagrammatically only. It should be understood that press 12 and feed means 18 are merely representative of equipment with which the masking and exposure means 10 embodying the invention can be incorporated in an automatic system capable of sequentially exposing great numbers of sheets of photosensitive materials in a short period of time.

The photosensitive sheet 14 fed by the means 18 to the light transmitting cylinder 20, starts to wrap around the cylinder due to the flexibility of the photosensitive material 14. As the cylinder rotates, the photosensitive material 14 adheres in its entirety to the cylinder and rotates in unison therewith until after the selective exposure has occurred by recourse to the equipment comprising apparatus 10 described in detail hereinafter.

The apparatus 10 includes masking means 16, a light source 26, a power supply unit 28 and timing means 30. The power supply unit 28 includes means for storing large quantities of electrical energy and circuitry for discharging the energy to the light source 26 to provide a pulse of light of sufficient intensity to accomplish the desired selective exposure of the photosensitive material.

The masking means 16 is comprised generally of a transparent cylinder 20 with a mask 32 affixed thereon. The mask 32, which has selected transparent areas 34 and opaque areas 36, determines which areas of the sensitized paper 14 will be exposed to the light from the pulsed lamp or light source 26. The areas of the photosensitive material overlaying the transparent areas 34 will be desensitized or exposed. The areas on the photosensitive sheet which rest over the opaque areas 36 of the masking means will not be exposed to light and will remain photosensitive and thereby capable of subsequent exposure.

It is also contemplated that silver halide paper may be used with the masking means, although the pattern of exposure is reversed from that established on a conventional photosensitive material. The reason for this is that in a silver halide process, the light is not transmitted through a transparent or translucent carrier but rather directly onto the photosensitive material.

The cylinder 20 which supports the masking means 16 must be made from a suitably transparent or translucent rigid material such as quartz, glass or plastic. The masking means 16 also may be constructed from a varity of materials, such as acetate or polyester films. Also, the mask may be etched directly on the surface of the cylinder in lieu of or in addition to the plastic film mask.

The light source 26 of apparatus 10 is comprised of a tube 38 filled with a suitable vapor, such as xenon gas, and is mounted on a conventional holder, such as a spider assembly 40. The assembly 40 holds the tube 38 in a fixed position as the cylinder 20 rotates about the tube 38. The electrical connections from the power supply unit 28 to supply the energy to periodically pulse the tube 38 are made through end caps 42 which resemble conventional fuse clips. The lighting means 26 and its attendant structure are mounted in the sidewall 44 of the support means for the apparatus 10.

The tube 38 (FIGS. 1 and 2) is normally quiescent and is pulsed or flashed only when needed to expose the selected areas on the photosensitive sheet material 14 through masking means 16. The cylinder 20 may also contain a reflector 46 situated around the half of the inner wall of the cylinder 20 opposite the mask 16 to increase the optical efficiency of the flash operation of tube 38.

Figure 6:
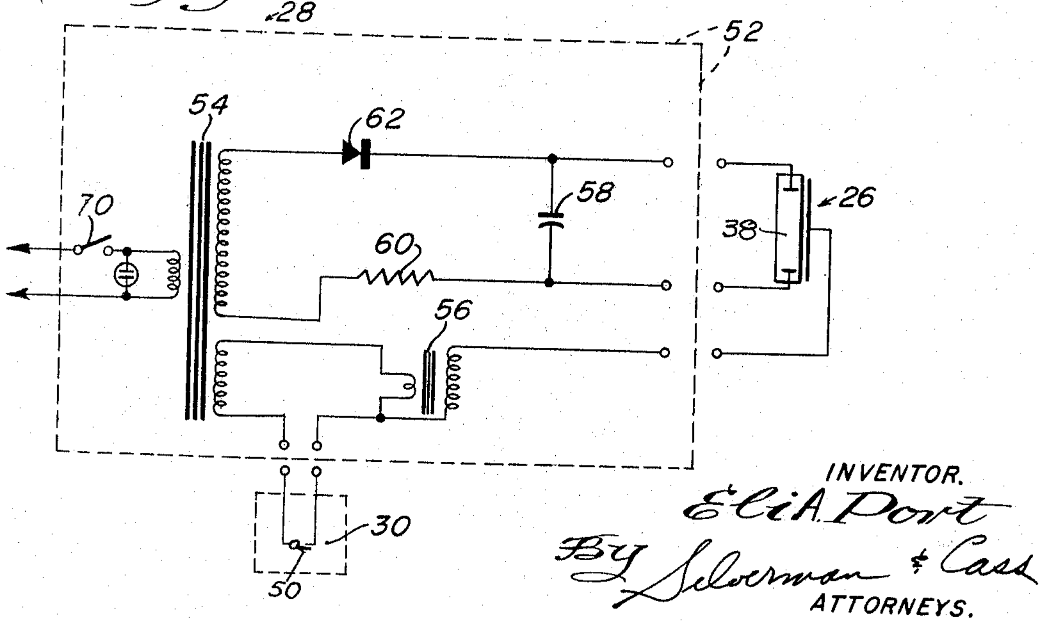
FIG. 6 is a circuit diagram for the timing means, power supply source and tube pulsing means employed in the invention.

The power supply-capacitor bank 28 which supplies the electrical energy to periodically activate the tube 38 is seen in detail in FIG. 6. The rectangle consisting of dotted lines 52 represents the housing in which the power supply-capacitor bank 28 resides. The components of the power supply-capacitor bank include a first transformer 54 and a second transformer 56, a capacitor 58, a resistance 60, and a rectifier 62.

The first transformer 54 raises or steps up the supply voltage to the level necessary to charge capacitor 58. The rectifier 62 in the circuit transforms the A.C. supplied across the transformer secondary to D.C. for subsequent use in actuating light source 26. Resistance 60 determines both the maximum pulsing frequency and the maximum charging current. The second transformer 56 which is connected with part of the timing means 30 provides a trigger pulse which fires the tube 38 at the appropriate time in the operating cycle. The power supply-capacitor bank unit 28 also contains the switches, meters and other related control means, necessary for operation of the disclosed system. A switch 70 is shown in FIG. 6 for starting and stopping the apparatus.

Figures 4, 5:
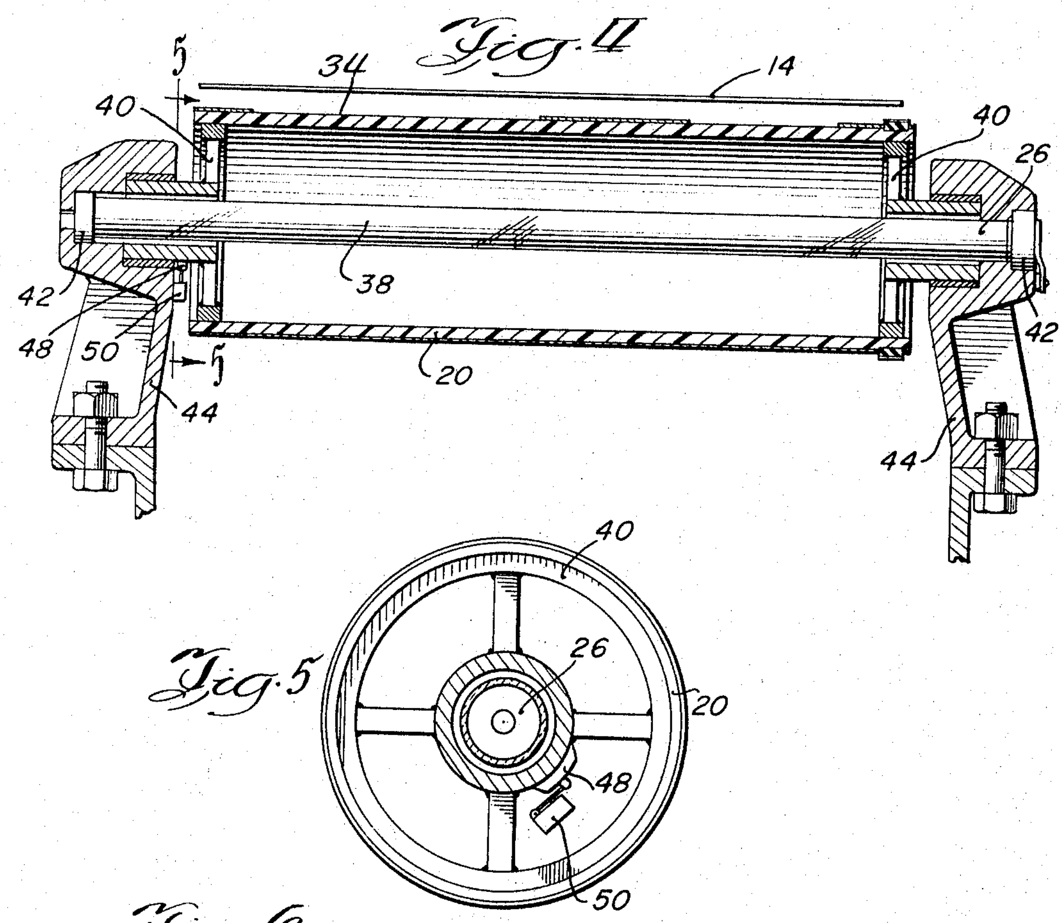
FIG. 4 is a sectional view taken through the cylinder along the longitudinal axis thereof, showing the details of the supporting means for the cylinder and the relative position of a sheet of photosensitive material being fed to said cylinder.
FIG. 5 is an enlarged view taken along line 5—5 of FIG. 4 showing spider assembly used to mount the light source within the cylinder, and the means to close the circuit to pulse the light source.

Timing means 30 of apparatus 10 controls the pulsing operation of tube 38. As indicated in FIG. 5, the timing means may consist of a radially extending lug 48 mounted on the periphery of the cylinder 20, or a small axial distance therefrom. As the cylinder rotates and the flexible, photosensitive material 14 wraps around the cylinder, the lug 48 will trip normally open switch means 50 to actuate the power bank 28 to fire tube 38. The positioning of the lug means 48 in reference to switch means 50 determines the portion of the cycle during which tube ignition will occur. The mechanical timing means illustrated is merely exemplary, since other suitable timing systems of an electrical, magnetic, optical, or mechanical nature could be feasible. For example, an optical timing means employing a photocell might be synchronized with a registration mark on the cylinder. Alternatively, a suitable timing means would include a signal transmitting device, such as a magnetic tape, that would transmit a signal to a magnetic pick-up head to close a normally opened switch to the pulse means 26. Other timing means also are feasible which will respond to signals from remote sources. The masking means 16 and the timing means

30 are synchronized so that the lamp 38 is not pulsed until the photosensitive sheet 14 completely adheres to the outside circumference of the cylinder and overlays the masking means 16. This is accomplished by selectively locating the lug 48 or alternative actuating means in relation to the switch or circuit to be activated to pulse the lamp 38 during the rotational cycle.

Then, as the transparent cylinder rotates in unison with the photosensitive sheet material 14 and reaches the predetermined position is its cycle, the timing means 30 activates the power supply unit 28 which pulses the light source 26. The light source 26 is pulsed to change from its normal, quiescent state to its activated state momentarily, and emits light of sufficient intensity to expose the photosensitive material 14 overlaying the masking means 16 in a brief time interval. The exposed material subsequently drops into a suitable receptacle or hopper 59. The light source 26 quickly returns to its normal, quiescent state and the apparatus 10 is ready to repeat its cycle of operation with a new sheet of photosensitive material.

The selective masking and exposure apparatus described above have many and varied applications. For example, the apparatus 10 has proven invaluable in preparing selectively masked business forms from photosensitive sheet material for inventory control, for cost accounting procedures, for acknowledging shipping orders, and many other operations too numerous to require mention specifically.

It is believed that the invention has been described in sufficient detail to enable the skilled artisan to understand and practice the same. Variations are believed possible, such as in the type of gas used in the light source, without circumventing the invention. The invention has been particularly pointed out in the claims hereto appended, it being intended that the language of the claims be construed broadly commensurate with the improvements in the arts and sciences engendered thereby.

I claim:

1. Apparatus for use with photosensitive duplicating machines to selectively expose predetermined areas of photosensitive sheet material to be used with said duplicating machines while shielding from exposure those areas of the sheet material that will receive the image, said apparatus comprising a rotary-driven cylinder constructed of light transmitting material, a light source position within said cylinder and connected to a source of power, masking means associated with said cylinder and rotating therewith, said masking means comprised of a predetermined pattern of opaque and transparent sections such that said transparent sections correspond to said predetermined areas of the photosensitive sheet material to be exposed, and said opaque sections corresponding to the predetermined image receiving areas of said sheet material, and control means responsive to a signal for energizing said light source to produce a flash of sufficient intensity to expose photosensitive material, the light from said light source being transmitted through said transparent sections of said masking means to simultaneously expose said predetermined areas while said opaque areas shield said image receiving areas from said light.

2. Apparatus as defined in claim 1 wherein said control means is provided with means for maintaining said light source in a normally quiescent state prior to reception of said signal for energizing said light source to produce said flash.

3. Apparatus as defined in claim 1 wherein said cylinder is provided with a reflector positioned diametrically opposite the transparent portion sections of said masking means to increase the optical efficiency of said light source.

4. The apparatus of claim 1 in which said masking means and said control means for energizing said light source are synchronized so that said light source is not flashed until said photosensitive sheet is completely engaged with the circumference of said cylinder and overlays said masking means.

5. The apparatus as defined in claim 1 in which timing means are provided to control said control means for energizing said light source at a predetermined time during which the photosensitive sheet is properly positioned over said masking means.

6. The combination of claim 5 in which said timing means comprises a mechanical element positioned on the rim of said cylinder and a normally opened switch situated adjacent to said cylinder, said switch being momentarily closed by said element as said cylinder rotates to close the circuit between said light source and said power source.

7. The apparatus as defined in claim 5 in which said timing means comprises a photocell responsive circuit, and means positioned on said cylinder to momentarily activate said photocell responsive circuit during the cycle of rotation of said cylinder, said photocell responsive circuit being operable to close the circuit between said light source and said source of power to produce the desired flash.

8. In combination with photosensitive duplicating apparatus, apparatus for selectively exposing predetermined areas of photosensitive sheet material to be used with said machine whereby the copies so produced are provided with predetermined masked areas and image receiving areas, said apparatus comprising a rotary driven cylinder constructed of light transmitting material, a light source positioned within said cylinder and connected to a power source, masking means associated with said cylinder and rotating therewith, said masking means comprised of a predetermined pattern of opaque and transparent sections, said transparent sections corresponding in position to said predetermined areas of the photosensitive sheet to be masked, and said opaque sections corresponding to the predetermined areas of said photosensitive sheet material to receive the image, and control means responsive to a signal for energizing said light source to produce a flash of sufficient intensity to expose photosensitive material, the light from said source being transmitted through said transparent sections of said masking means to simultaneously expose said predetermined areas on said photosensitive material, while said opaque areas shield the image receiving areas of said sheet material.

9. Apparatus as defined in claim 8 wherein said control means is provided with means for maintaining said light source in a normally quiescent state prior to reception of said signal for energizing said light source to produce said flash.

10. Apparatus as defined in claim 8 wherein said cylinder is provided with a reflector positioned diametrically opposite the transparent portion sections of said masking means to increase the optical efficiency of said light source.

11. The apparatus of claim 8 in which said masking means and said control means for energizing said light source are synchronized so that said light source is not flashed until said photosensitive sheet is completely engaged with the circumference of said cylinder and overlays said masking means.

12. The apparatus as defined in claim 8 in which timing means are provided to control said control means for energizing said light source at a predetermined time during which the photosensitive sheet is properly positioned over said masking means.

13. The combination of claim 12 in which said timing means comprises a mechanical element positioned on the rim of said cylinder and a normally opened switch situated adjacent to said cylinder, said switch being momentarily closed by said element as said cylinder rotates to close the circuit between said light source and said power source.

14. The apparatus as defined in claim 12 in which said timing means comprises a photocell responsive circuit, and means positioned on said cylinder to momentarily activate said photocell responsive circuit during the cycle of rotation of said cylinder, said photocell responsive circuit being operable to close the circuit between said light source and said source of power to produce the desired flash.

15. Apparatus for selectively exposing predetermined areas of photosensitive sheet material to be used with a photosensitive duplicating machine so as to produce copies having predetermined masked areas, said apparatus comprising a sheet material receiving station, said station being positioned over a light source capable of producing a pulse of light of sufficient intensity to expose photosensitive material, a masking element associated with said station and positioned between said light source and the photosensitive sheet material to be selectively exposed, said masking element being comprised of a predetermined pattern of opaque and transparent sections, means for positioning said sheet material in relation to said masking element such that said transparent areas of said masking element are juxtaposed to the predetermined areas of said photosensitive sheet material to be masked, while said opaque sections are juxtaposed to the areas of said photosensitive sheet material that will receive the image from the duplicating machine, and control means for energizing said light when said respective areas are so positioned so as to produce a pulse of light which simultaneously exposes all of said areas to be masked while said image receiving areas are shielded from said pulse of light by said opaque sections of the masking element.

16. A method of producing selectively masked duplicate copies from photosensitive material comprising the steps of providing a masking means having a predetermined pattern of opaque and transparent areas thereon, selecting said pattern such that the transparent areas correspond to the portions of the sheet material to be masked while said opaque areas correspond to those portions of the sheet material that will receive the image from a master copy when the photosensitive sheet material is properly positioned therewith, positioning said masking means about the circumferential wall of a cylinder capable of transmitting light from the interior thereof from a light source of sufficient intensity to expose photosensitive material, positioning a photosensitive sheet to be selectively exposed over said masking means, selectively energizing said light source so as to transmit a pulse of light momentarily through said transparent portions of said masking means of sufficient intensity to instantaneously expose photosensitive material, simultaneously exposing all of the areas of said sheet material to be masked to said light source while shielding the image receiving areas of said sheet material.

17. A method for producing selectively masked portions on duplicate copies, said method including a photosensitive copying process that produces duplicate copies from photosensitive sheet material, said copying process being augmented by the masking process comprised of the steps of providing a path of travel for said photosensitive sheet material, positioning a selectively operable light source having sufficient intensity to expose a sheet of photosensitive material adjacent to the path of travel of said material, positioning a masking means between said light source and said path of travel of said photosensitive sheet material, providing said masking means with predetermined opaque and light transmitting areas, positioning a sheet of photosensitive material with respect to said masking means such that the preselected areas to be masked on said photosensitive sheet material are in juxtaposition with the light transmitting areas of said masking means while the image receiving areas of said sheet material are in juxtaposition with opaque areas of said masking means, energizing said light source for a brief period of time to transmit a pulse of light through said light transmitting areas of said masking means, simultaneously exposing all of said preselected areas to be masked while shielding the image receiving portions of said sheet material from said pulse of light.

18. The method as defined in claim 17 wherein said photosensitive paper has its said preselected masked areas exposed prior to the photosensitive copy process.

19. A method of producing selectively masked duplicate copies from photosensitive sheet material which comprises the steps of positioning said photosensitive sheet material over masking means, having a predetermined pattern of opaque and transparent areas thereon, energizing a light source positioned below said masking means to transmit a pulse of light from said source through said transparent areas, simultaneously exposing the areas of said photosensitive sheet material juxtaposed to said predetermined transparent areas of said masking means while shielding said areas juxtaposed to said opaque areas of said masking means from said pulse of light, subjecting said partially exposed sheet material to a photosensitive duplicating process wherein those portions of the sheet material which were shielded from said light source by the opaque areas of the masking means receive an image from a master copy, while said previously exposed areas receive no such image to define a masked area.

References Cited by the Examiner

UNITED STATES PATENTS 3,320,857 1/1966 Ritzerfeld et al. ------- 95—75

NORTON ANSHER, *Primary Examiner.*

R. A. WINTERCORN, *Assistant Examiner.*